Уnited States Patent [19]
Stoloff et al.

[11] 4,203,880
[45] May 20, 1980

[54] LUBRICANT COMPOSITION FOR HALOGEN-CONTAINING POLYMERS

[75] Inventors: Alfred Stoloff, Livingston; Anthony L. Williams, Summit, both of N.J.

[73] Assignee: M&T Chemicals Inc., Woodbridge, N.J.

[21] Appl. No.: 959,707

[22] Filed: Nov. 13, 1978

[51] Int. Cl.² .................. C08F 10/02; C08F 14/06; C08J 3/18
[52] U.S. Cl. ................ 260/23 XA; 260/28.5 D; 264/300; 525/214; 525/240
[58] Field of Search ........ 260/23 XA, 28.5 D, 897 C; 264/300; 525/214, 240

[56] References Cited

U.S. PATENT DOCUMENTS

| | | | |
|---|---|---|---|
| 3,442,837 | 5/1969 | Brotz et al. | 260/897 C |
| 3,627,716 | 12/1971 | Cohen | 260/23 XA |
| 3,979,347 | 9/1976 | Brotz et al. | 260/897 C |
| 4,132,691 | 1/1979 | Ejk | 260/23 XA |

*Primary Examiner*—Ronald W. Griffin
*Attorney, Agent, or Firm*—Kenneth G. Wheeless; Robert Spector

[57] ABSTRACT

The processability and melt strength of halogen-containing polymers derived at least in part from vinyl chloride or vinylidene chloride are significantly improved using a conventional external lubricant in combination with an oxidized ethylene polymer exhibiting a melt viscosity of from 1,000 to about 60,000 centipoises at 140° C. and an acid number of at least 5.

22 Claims, No Drawings

LUBRICANT COMPOSITION FOR HALOGEN-CONTAINING POLYMERS

BACKGROUND OF THE INVENTION

This invention relates to additives for improving the processability of molten polymer compositions wherein the major component is a halogen-containing polymer. This invention further relates to additives that improve the appearance and physical properties of articles formed from halogen-containing polymer compositions.

It is well known to employ various additives to modify the properties of halogen-containing polymers, particularly homopolymers and copolymers of vinyl chloride. Among the most frequently employed additives are heat stabilizers, lubricants such as paraffin waxes and esters or salts of fatty acids to improve the flow properties of the composition and processing aids such as poly-α-methylstyrene and polymethyl methacrylate to increase the melt strength of the polymer. Melt strength is of particular importance for extrudable compositions, since it is a prime factor in determining the maximum extent to which the diameter of a continuous solid extrudate or the wall thickness of a continuous hollow extrudate such as a pipe can be reduced uniformly in the absence of breaks and other defects. The melt strength of a polymer formulation is also a major factor in determining the ease with which the initial portion of an extrudate formed from the formulation can be fed by hand through vacuum sizing tanks, rolls and other equipment required to shape or otherwise process the polymer formulation before it has completely solidified. This procedure, referred to in the trade as "stringing up" an extruder, is a required step in many extrusion processes, particularly if the product is a hollow object such as a tube or pipe.

The use of processing aids is of particular importance for the extrusion of pipe from vinyl chloride polymer compositions. The resultant higher melt strength enables the molten pipe to be drawn down to relatively small wall thicknesses. The range of wall thicknesses that can be produced without the necessity of changing the extruder die is significantly increased by incorporating one of the known processing aids in the polymer formulation. The use of these processing aids is not without some disadvantages, however. In addition to significantly increasing the cost of the polymer formulation, the presence of these processing aids imparts a brittleness and high gloss level to the final pipe.

Oxidized polyolefins having melt viscosities of less than 300 centipoises and a dicarboxylic acid content of from 20 to 80 weight % have been used to impart transparency to vinyl chloride polymers. U.S. Pat. No. 3,979,347 teaches that this property is characteristic of oxidation products of ethylene polymers wherein the polymers exhibit a molecular weight of from 10,000 to 1,000,000. Some of these polymers exhibit melt viscosities of from 1,000 to 60,000 centipoises at 140° C. The oxidized polymer is the only lubricant present in the composition. These compositions are not suitable for extrusion because of their high melt viscosities. The large amount of torque required to process such a composition is above the operable limit for most extruders. The amount of electrical current required to achieve this torque could damage the motor of the extruder. The addition of a paraffin wax or other conventional lubricant for the purpose of lowering the melt viscosity would decrease the transparency of the final article, which is contrary to the objectives of the aforementioned U.S. Pat. No. 3,979,347.

It is an objective of this invention to increase the melt strength of compositions containing polyvinyl chloride or other halogen-containing polymers without imparting undesirable properties to the final shaped article, particularly the high gloss and brittleness that are characteristic of conventional processing aids.

It has now been found that this objective can be achieved using polymer compositions containing polyvinyl chloride or other halogen-containing polymer, a conventional external lubricant, such as a natural or synthetic paraffin wax, a conventional heat stabilizer and an oxidized ethylene homopolymer or an oxidized copolymer of ethylene and at least one additional α-olefin, with the proviso that the oxidized polymer exhibits an acid number greater than about 5 and a melt viscosity of from 1,000 to about 60,000 centipoises at a temperature of 140° C.

SUMMARY OF THE INVENTION

This invention provides a composition for improving the melt strength and processability of polymers formed from at least one halogen-containing ethylenically unsaturated compound, said composition comprising (1) an effective amount of a conventional heat stabilizer for said polymers, (2) an effective amount of an external lubricant for said polymers and (3) an oxidized polymer wherein at least 50% of the repeating units are derived from ethylene and any remaining repeating units are derived from at least one α-olefin containing from 3 to 10 carbon atoms, wherein said oxidized polymer exhibits an acid number greater than 5 and a melt viscosity of from 1,000 to about 60,000 centipoises at a temperature of 140° C.

DETAILED DESCRIPTION OF THE INVENTION

The novel feature that characterizes the compositions of this invention is the combination of a conventional external lubricant for halogen-containing polymers such as polyvinyl chloride and an oxidized homopolymer or copolymer of ethylene having a melt viscosity of from 1,000 to about 60,000 centipoises, measured at 140° C., and an acid number of about 5 or greater. Lower molecular weight oxidized polymers do not impart the level of melt strength required for good drawability of an extrudable composition. Drawability is a measure of the extent to which the initial wall thickness of a hollow extruded article such as a pipe or the diameter of a continuous solid extrudate such as a rod can be uniformly reduced without fracture or other defect. The lubricant is required to reduce the melt viscosity of the polymer composition to a level that can be processed in conventional extruders.

The lubricant component of the present composition can be any of the conventional "external" lubricants that have heretofore been employed in compositions containing polyvinyl chloride and other halogen-containing polymers. The lubricants are classified as "external" because they are at least partially incompatible with the molten polymer. The lubricant will therefore migrate to the surface of the molten polymer and form a film between the polymer and the heated metal surfaces of the extruder, mill or other equipment used to process the polymer composition. This film significantly reduces the tendency of the polymer to adhere to these metal surfaces and degrade. A number of classes of external lubricants suitable for use in the compositions of this invention are disclosed in articles that appeared in the June, 1967 issue of the Journal of the Society of Plastic Engineers and the March, 1972 issue of Polymer Engineering. These classes of lubricants include paraffin oils, paraffin waxes, liquid and solid hydrocarbons, non-oxidized polyethylene waxes, montan ester waxes, lead stearate, mineral oil, 12-hydroxystearic acid, ethylene bis-stearamide and glycol esters of fatty acids that contain from 10 to 20 or more carbon atoms.

Oxidized ethylene polymers contain free or esterified carboxylic acid residues and can be prepared by reacting an ethylene homopolymer or copolymer with oxygen or an organic peroxide or hydroperoxide under conditions that produce a polymer exhibiting an acid number of 5 or more. The melt viscosity of the polymer, which is a function of molecular weight, must be within the range from 1,000 to about 60,000 centipoises at a temperature of 140° C. if the polymer is to be used in the present compositions. The accompanying examples demonstrate that many oxidized polyethylenes disclosed in the chemical and patent literature are of relatively low viscosity and therefore not within the scope of the present invention, since they will not improve the melt strength of halogen-containing polymers, particularly polyvinyl chloride.

In order to achieve the desired combination of processability and melt strength in an extrudable composition the weight ratio of external lubricant to oxidized ethylene polymer should be from 1:20 to about 60:1. The relative amounts of lubricant and oxidized polymer that will provide optimum processability for a given polymer formulation is dependent upon a number of parameters that include the composition of the polymer, the method of polymerization (bulk or suspension), the molecular weight of the polymer, the type of extruder or other processing apparatus and the processing conditions. If there is too little lubricant present in the final polymer composition, the melt viscosity of the polymer composition may be too high or the fusion time may be too short. Too short a fusion time is undesirable for extrudable compositions, since this can result in prolonged exposure of the polymer melt to elevated temperatures, resulting in premature degradation. Too high a concentration of lubricant may cause a condition referred to as "plate out". The excess lubricant rises to the surface of the polymer composition and remains in contact with the heated wall of the extruder, mill or calendar roll for a sufficient time to become charred. The char is either carried along with the molten polymer causing discoloration, or the char may form deposits along the inner wall or in the die of an extruder, thereby altering the shape of the extruded article. The amount of external lubricant required for any given polymer composition that is processed under a specified set of conditions can readily be determined with a minimum of experimentation.

The concentration of oxidized ethylene polymer in a composition containing polyvinyl chloride or other halogen-containing polymer is from 0.05 to about 2 parts by weight per 100 parts of halogen-containing polymer. As previously discussed, the amount of external lubricant is adjusted to achieve the desired melt viscosity without "plate out" of excess lubricant. The concentration of lubricant in the final polymer composition is from 0.1 to about 3 parts by weight per 100 parts of polymer.

The third component of the present compositions is a conventional heat stabilizer for halogen-containing polymers such as polyvinyl chloride. A preferred class of heat stabilizers includes organotin compounds containing one or two hydrocarbon groups bonded to tin with at least one of the remaining valences on the tin atom being satisfied by a sulfur atom. The sulfur atom can be bonded to one or two tin atoms and no other atoms. Alternatively, the sulfur atom can be bonded to tin and a carbon atom that forms part of the hydrocarbon portion of a mercaptan, mercaptoacid, mercaptoalkanol or an ester derived from a mercaptoacid and an alcohol or a mercaptoalkanol and a carboxylic acid. A preferred type of stabilizer contains at least two sulfur atoms bonded to each tin atom and can be represented by the general formula

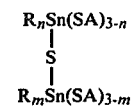

wherein R is hydrocarbyl containing from 1 to 20 carbon atoms, preferably lower alkyl, A represents the residue obtained by removal of a mercapto (—SH) group from a mercaptan, mercaptoacid, mercaptoalkanol or an ester derived from a mercaptoacid or a mercaptoalkanol, and m and n are identical or different and represent the integer 1 or 2.

A particularly preferred class of stabilizers is one wherein SA of the foregoing formula represents the residue of a mercaptoalkanol that is esterified with a dicarboxylic acid such as adipic or azaleic acid. The second carboxyl group of the dicarboxylic acid is also esterified with a mercaptoalkanol that is in turn bonded to a tin atom through sulfur. A representative of this preferred class of stabilizers exhibits a formula that can be written as

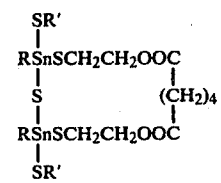

wherein R' is hydrocarbyl and is selected from the same group as R.

A second preferred class of organotin stabilizers contain only one tin atom per molecule and are derivatives of mercaptoacid esters. This class of stabilizers includes dibutyltin-S,S'-bis(isooctyl mercaptoacetate).

Other classes or organotin compounds that impart useful levels of heat stability to halogen-containing polymers can be represented by the general formulae

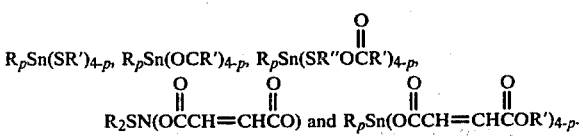

In the foregoing formulae R and R' are each a monovalent hydrocarbon radical, usually alkyl, and contain from 1 to 12 carbon atoms, and R" is an alkylene radical containing from 2 to 8 carbon atoms. Preferably R is methyl, butyl or octyl. R' is isooctyl or lauryl and R" is ethylene. The subscript "p" represents the integer 1 or 2.

Other classes of compounds which have been used as heat stabilizers for polyvinyl chloride and other halogen-containing polymers are organosulfur-containing antimony compounds such as antimony-S,S',S"-tris-(isooctyl mercaptoacetate), and alkaline earth metal salts of carboxylic acids containing from 8 to about 20 carbon atoms, particularly calcium and barium salts. These salts can be used alone or in combination with salts of the same carboxylic acids and elements from group IIb of the periodic table, preferably zinc and cadmium salts.

A more complete discussion of suitable heat stabilizers for vinyl chloride polymers is contained in a text entitled "The Stabilization of Polyvinyl Chloride" by F. Chevasaus and R. de Broutelles. As previously disclosed, the present lubricants and oxidized polyolefins should be compatible with most, if not all, of these conventional heat stabilizers.

In addition to the external lubricant, heat stabilizer and oxidized ethylene polymer the present compositions may contain one or more additives conventionally employed in moldable or extrudable polymer compositions. These additives include fillers such as alkaline earth metal carbonates, pigments such as titanium dioxide, processing aids such as homopolymers and copolymers of esters of acrylic and methacrylic acids, antioxidants such as sterically hindered phenols or bis-phenols, impact modifiers such as methyl methacrylate-butadiene-styrene terpolymers and adsorbants such as the alkaline earth metal silicates and diatomaceous earth if the composition contains a significant amount of of liquid ingredients.

The term "halogen-containing polymer" as employed in the present specification refers to homopolymers and copolymers prepared by the polymerization of one or more halogen-containing ethylenically unsaturated compounds. This class of compounds is represented by vinyl chloride and vinylidene chloride. These halogen-containing compounds can be polymerized individually, in combination with one another or in combination with one or more non-halogen-containing ethylenically unsaturated compounds. Examples of suitable non-halogen-containing compounds include vinyl acetate and esters of ethylenically unsaturated acids such as methyl methacrylate and ethyl acrylate.

The following examples disclose preferred embodiments of the present compositions and should not be interpreted as limiting the scope of the accompanying claims. All parts and percentages are by weight unless otherwise stated.

The melt strengths of the formulations described in the following examples were determined by extruding the formulations in the form of a continuous pipe using a single-screw extruder (Type 150-24LH, manufactured by Modern Plastics Machinery Corporation). The diameter of the screw was 1½ inches (3.8 cm) and the extruder was equipped with a pipe extrusion head having a die diameter of 1 inch (2.5 cm). The space between the mandrel and the wall of the die measured 0.059 inch (0.15 cm). A pipe puller was employed to control the wall diameter of the pipe. When the temperatures in the various zones of the extruder reached the values specified in the example, the wall thickness of the extruded pipe was reduced by gradually increasing the speed of the pipe puller while the extrusion rate was maintained constant. A conventional vacuum sizing tank was located between the extruder and the pipe puller.

The melt strength of the polymer formulation can be determined by measuring the minimum wall thickness that can be achieved without tearing apart of the pipe. This property is conventionally referred to as "draw down" and is calculated using the following equation:

% draw down = $(d-t)/d \times 100$ wherein d is the width of the die orifice, in inches, and t is the minimum wall thickness (in inches) that can be achieved without rupturing the pipe wall.

EXAMPLE 1

The formulation evaluated for melt strength contained 100 parts of a pipe grade vinyl chloride homopolymer exhibiting an inherent viscosity of 0.94, 3.0 parts calcium carbonate, 1.0 part titanium dioxide, 0.4 part dibutyltin-S,S'-bis(isooctyl mercaptoacetate) as the heat stabilizer, 0.8 part of a paraffin wax exhibiting a melting point of 165° C. and 0.12 part of one of six different oxidized polyethylene waxes. The melt viscosities of these waxes and their acid numbers are listed in the following Table 1 together with the maximum % draw down that could be achieved. The melt viscosities of the oxidized polyethylenes described in the following specification were measured at 140° C. using a Brookfield viscometer equipped with a number 1 spindle. The viscosity value of 200 centipoises was measured using a number 3 spindle.

The extrusion rate was from 49 to 56 pounds per hour (22 to 26 kg per hour), the speed of the screw drive was 50 revolutions per minute (RPM) and the temperatures in the various zones of the extruder were as follows:

| Extruder Zone 1 | 186° C. |
| Extruder Zone 2 | 186° C. |
| Extruder Zone 3 | 186° C. |
| Gate | 153° C. |
| Die Zone 1 | 153° C. |
| Die Zone 2 | 186° C. |
| Polymer Temp. | 194° C. |

TABLE 1

| Melt Viscosity (cps) | Acid No. | % Draw Down |
|---|---|---|
| 1000 | 17 | 60 |
| 1500 | 18 | 64 |
| 4700 | 22 | 71 |
| 9000 | 28 | 76 |
| 15000 | 16 | 83 |
| 30000 | 16 | 90 |

The foregoing data demonstrate the direct relationship between % draw down and the viscosity of the oxidized polyethylene. A draw down of less than about 60% is not considered commercially acceptable.

During a similar evaluation using an oxidized polyethylene having a melt viscosity of 200 at 140° C., the maximum % draw down was less than 5%.

EXAMPLE 2

All of the formulations evaluated contained 100 parts of a pipe grade vinyl chloride homopolymer exhibiting an inherent viscosity of 0.94, 3.0 parts calcium carbonate, 1.0 part titanium dioxide, 0.4 part di-n-butyltin-S,S'- bis(isooctyl mercaptoacetate) as the heat stabilizer, 0.8 part of a paraffin wax having a melting point of 165° C. and 0.21 part of one of seven different oxidized polyethylenes having a melt viscosity and acid number listed in Table 2, which also reports the % draw down of the formulation. The formulations were extruded in the form of a pipe using the apparatus described in the preceding Example 1 and the following extruder conditions:

Extrusion Rate=34-43 pounds/hour (15.5-19.5 kg/hour)
Screw Drive Speed=40 RPM

| Temperatures | |
| --- | --- |
| Extruder Zone 1 | 180° C. |
| Extruder Zone 2 | 180° C. |
| Extruder Zone 3 | 176° C. |
| Gate | 180° C. |
| Die Zone 1 | 176° C. |
| Die Zone 2 | 197° C. |
| Polymer Melt | 202° C. |

TABLE 2

| Melt Viscosity (cps) @ 140° C. | Acid No. | % Draw Down |
| --- | --- | --- |
| 1000 | 17 | 78 |
| 1500 | 18 | 82 |
| 4700 | 22 | 85 |
| 9000 | 28 | 87 |
| 15000 | 16 | 90 |
| 30000 | 16 | 91 |
| 45000 | 7 | 91 |

The data in Table 2 demonstrate the surprisingly high maximum % draw down that can be achieved using oxidized polyethylene having a melt viscosity that is within the scope of this invention. The pipe was of acceptable quality and exhibited unexpectedly smooth and glossy inner and outer walls.

EXAMPLE 3

This example demonstrates that polymer formulations similar to those disclosed in U.S. Pat. No. 3,979,347 cannot be processed using conventional extrusion equipment.

A formulation containing 100 parts of a pipe grade vinyl chloride polymer exhibiting an inherent viscosity of 0.94 cps, 1.5 parts of a conventional sulfur-containing organotin stabilizer and 2.0 parts of an oxidized polyethylene having a melt viscosity of 7,000 centipoises was placed in the bowl of a Brabender ® torque rheometer. The bowl was maintained at a temperature of 200° C. and the speed of the blades was 60 RPM. The size of the sample was 62 grams, the fusion time for the formulation was 0.8 minute and the maximum torque was 3400 meter grams. The fusion time for conventional extrudable formulations are in the range from 1.7 to 5.0 minutes. A shorter fusion time will cause degradation and discoloration of the molten polymer resulting from a prolonged exposure to heat while in the molten state. The maximum torque value, a measure of the melt viscosity, should be from 1800 to 2500 meter grams. Higher torque values would result in an excessively high current demand and possible damage to the extruder motor.

A pipe prepared using the formulation described in the first part of this example had very rough inner and outer walls and was extremely brittle. The extrusion conditions were similar to those specified in the preceding Example 2.

EXAMPLE 4

This example demonstrates the effect of the melt viscosity of an oxidized polyethylene on the fusion time of a polyvinyl chloride formulation containing a paraffin wax as the external lubricant. The formulation exhibited the following composition:

| Ingredient | Parts |
| --- | --- |
| Polyvinyl chloride ($\eta$inherent = 0.94) | 100 |
| Titanium dioxide | 1.0 |
| Calcium carbonate (stearic acid coated) | 3.0 |
| Paraffix wax (m.p. = 73° C.) | 0.9 |
| Stabilizer | 0.35 |
| Stabilizer Composition | |
| Organotin compound* | 24.0 |
| Calcium silicate | 11.0 |
| Bisphenol A | 7.0 |
| Calcium carbonate | 8.0 |

*A commercially available sulfur-containing diorganotin heat stabilizer.

The foregoing formulation, in an amount of 105.25 parts by weight, was combined with one of four different oxidized polyethylenes having melt viscosities (measured at 140° C.) of from 200 to 45,000 centipoises. The concentration of the oxidized polyethylene (PE) was varied from 0.1 to 0.8 part by weight. The time required for a 62 gram sample to fuse was determined using a Brabender ® torque rheometer. The bowl of the rheometer was maintained at a temperature of 200° C. and the speed of the blades was 60 RPM. The fusion times for the various samples are recorded in the following table.

| Concentration of Oxidized PE (parts) | Melt Viscosity of Oxidized PE (centipoises) | Acid No. of Oxidized PE | Fusion Time (minutes) |
| --- | --- | --- | --- |
| 0.1 (control) | 200 | 16 | 4.8 |
| 0.3 (control) | 200 | 16 | 5.0 |
| 0.8 (control) | 200 | 16 | 6.2 |
| 0.1 | 7,000 | 40 | 3.6 |
| 0.3 | 7,000 | 40 | 1.7 |
| 0.8 | 7,000 | 40 | 1.2 |
| 0.1 | 9,000 | 28 | 3.5 |
| 0.3 | 9,000 | 28 | 2.2 |
| 0.8 | 9,000 | 28 | 1.2 |
| 0.1 | 30,000 | 16 | 3.2 |
| 0.3 | 30,000 | 16 | 2.0 |
| 0.3 | 30,000 | 16 | 1.2 |
| 0.1 | 45,000 | 7 | 3.3 |
| 0.3 | 45,000 | 7 | 2.3 |
| 0.8 | 45,000 | 7 | 1.3 |

Unexpectedly the fusion time decreased as the concentration of the oxidized polymer was increased for those oxidized polymers that are within the scope of this invention. By contrast, the fusion time of the control formulations increased with increasing concentration of an oxidized polyethylene having a melt viscosity of 200 centipoises. This indicates that the high molecular weight oxidized ethylene polymers of this invention function in a different manner than the low molecular weight materials conventionally employed to reduce "plate out" of incompatible additives in formulations containing vinyl chloride polymers.

EXAMPLE 5

This example demonstrates the increase in maximum draw down and the reduction in fusion time achieved when one of the present oxidized polyolefins is added to a formulation conventionally employed for pipe extrusion. The composition of the formulation was as follows:

| Ingredient | Parts |
|---|---|
| Polyvinyl chloride ($\eta$inherent = 0.94) | 100.0 |
| Titanium dioxide | 1.0 |
| Calcium carbonate (coated with stearic acid) | 3.0 |
| Paraffix wax (m.p. = 165° C.) | 1.1 |
| Oxidized polyethylene (melt viscosity @ 140° C. = 200 cps) | 0.15 |
| Processing aid* | 0.6 |
| Calcium stearate | 0.6 |
| Organotin heat stabilizer | 0.4 |
| Oxidized polyethylene (melt viscosity @ 140° C. = 30,000 cps)** | 0.14 |

*An acrylic polymer available as Acryloid ® K-120N from the Rohm and Haas Company, Philadelphia, Pennsylvania.
**Not present in control formulation (A).

The speed of the extruder screw drive was 50 RPM and the temperatures in the various zones of the extruder were as follows:

|  | Formulation A (control) | Formulation B |
|---|---|---|
| Extruder zone 1 | 189° C. | 189° C. |
| Extruder zone 2 | 186° C. | 186° C. |
| Extruder zone 3 | 197° C. | 197° C. |
| Gate | 169° C. | 169° C. |
| Die zone 1 | 180° C. | 172° C. |
| Die zone 2 | 191° C. | 191° C. |
| Polymer melt | 197° C. | 200° C. |

The maximum % draw down, the appearance of the inner wall of the final pipe and the fusion time (in minutes) for the two formulations were as follows:

| Formulation | Max % Draw Down | Fusion Time (minutes) | Appearance of Inner Wall |
|---|---|---|---|
| A (control) | 17% | 2 | Dull finish, numerous variations in diameter |
| B | 89% | 1.5 | More glossy finish than A, considerably more uniform diameter, only slight "waviness". |

The inner wall of the pipe obtained from the control formulation (A) had numerous periodic variations in diameter which had the appearance of waves. The inner wall of the pipe prepared using formulation B was considerably more uniform than the pipe prepared from formulation A and exhibited a more glossy appearance.

What is claimed is:

1. A composition for improving the melt strength and processability of polymers formed from at least one halogen-containing ethylenically unsaturated compound, said composition comprising (1) an effective amount of a heat stabilizer for said polymers, (2) an effective amount of an external lubricant for said polymers, said lubricant being selected from the group consisting of paraffin oils, paraffin waxes, liquid and solid hydrocarbons and non-oxidized polyethylene waxes, and (3) an oxidized polymer wherein at least 50% of the repeating units are derived from ethylene and any remaining repeating units are derived from at least one α-olefin containing from 3 to 10 carbon atoms, wherein said oxidized polymer exhibits an acid number greater than 5 and a melt viscosity of from 1,000 to about 60,000 centipoises at a temperature of 140° C.

2. A composition according to claim 1 wherein said polymer is polyvinyl chloride or a copolymer of vinyl chloride with at least one copolymerizable ethylenically unsaturated compound.

3. A composition according to claim 1 wherein said external lubricant is a paraffin wax.

4. A composition according to claim 1 wherein said heat stabilizer is an organotin compound or an organosulfur-containing antimony compound.

5. A composition according to claim 4 wherein said organotin compound contains at least two bonds between tin and two different sulfur atoms, the remaining valences of the tin atom being satisfied by bonds to carbon atoms of hydrocarbyl groups.

6. A composition according to claim 5 wherein said organotin compound contains one tin atom per molecule and is represented by a general formula selected from the group consisting of

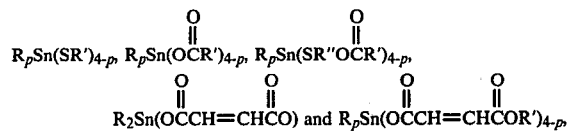

wherein R and R' are hydrocarbyl and contain from 1 to 12 carbon atoms, R" is alkylene and contains from 2 to 8 carbon atoms and p is 1 or 2.

7. A composition according to claim 5 wherein said organotin compound is represented by the general formula

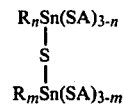

wherein R is hydrocarbyl and contains from 1 to 20 carbon atoms, A represents the residue obtained by removal of a mercapto (—SH) group from a mercaptan, mercaptoacid, mercaptoalkanol or an ester derived from a mercaptoacid or a mercaptoalkanol, and m and n are identical or different and represent the integer 1 or 2.

8. A composition according to claim 6 or 7 wherein R and R' are lower alkyl.

9. A composition according to claim 5 wherein said organotin compound is represented by the general formula

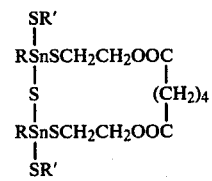

wherein R and R' are individually selected from the group consisting of hydrocarbyl containing from 1 to 20 carbon atoms.

10. A composition according to claim 1 wherein said oxidized polymer is an oxidized polyethylene.

11. A composition according to claim 1 wherein said composition contains an alkaline earth metal carbonate as a filler.

12. A halogen-containing polymer composition exhibiting improved melt strength and processability, said composition comprising (1) a halogen-containing polymer selected from the group consisting of homopolymers of vinyl chloride or vinylidene chloride and copolymers of vinyl chloride and vinylidene chloride with one another or with at least one copolymerizable ethylenically unsaturated compound, (2) an effective amount of a heat stabilizer for said halogen-containing polymer, (3) an effective amount of an external lubricant for said halogen-containing polymer, said lubricant being selected from the group consisting of paraffin oils, paraffin waxes, liquid and solid hydrocarbons and non-oxidized polyethylene waxes, and (4) from 0.05 to 1.5%, based on the weight of said halogen-containing polymer, of an oxidized polymer wherein at least 50% of the repeating units are derived from ethylene and any remaining repeating units are derived from at least one α-olefin containing from 3 to 10 carbon atoms, wherein said oxidized polymer exhibits an acid number greater than 5 and a melt viscosity of from 1,000 to about 60,000 centipoises at a temperature of 140° C.

13. A polymer composition according to claim 12 wherein said halogen-containing polymer is polyvinyl chloride or a copolymer of vinyl chloride with at least one copolymerizable ethylenically unsaturated compound.

14. A polymer composition according to claim 12 wherein said external lubricant is a paraffin wax.

15. A polymer composition according to claim 12 wherein said heat stabilizer is an organotin compound.

16. A polymer composition according to claim 15 wherein said organotin compound contains at least two bonds between tin and two different sulfur atoms, the remaining valences of the tin atom being satisfied by bonds to the carbon atoms of hydrocaryl groups.

17. A polymer composition according to claim 15 wherein said organotin compound contains one tin atom per molecule and is represented by a general formula selected from the group consisting of

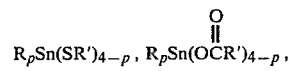

$R_pSn(SR')_{4-p}$, $R_pSn(OCR')_{4-p}$,

-continued

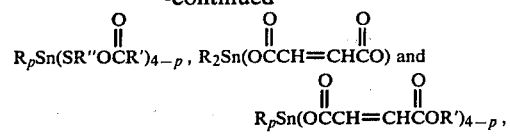

$R_pSn(SR''OCR')_{4-p}$, $R_2Sn(OCCH=CHCO)$ and $R_pSn(OCCH=CHCOR')_{4-p}$, wherein R and R' are hydrocarbyl and contain from 1 to 20 carbon atoms, R'' is alkylene and contains from 2 to 8 carbon atoms and p is 1 or 2.

18. A polymer composition according to claim 15 wherein said organotin compound is represented by the general formula

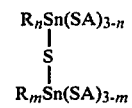

$R_nSn(SA)_{3-n}$
|
S
|
$R_mSn(SA)_{3-m}$ wherein R is a hydrocarbyl and contains from 1 to 20 carbon atoms, A represents the residue obtained by removal of a mercapto (—SH) group from a mercaptan, mercaptoacid, mercaptoalkanol or an ester derived from a mercaptoacid or a mercaptoalkanol, and m and n are identical or difference and represent the integer 1 or 2.

19. A polymer composition according to claim 17 or 18 wherein R is lower alkyl.

20. A composition according to claim 15 wherein said organotin compound is represented by the general formula

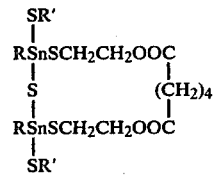

SR'
|
RSnSCH₂CH₂OOC
|            |
S          (CH₂)₄
|            |
RSnSCH₂CH₂OOC
|
SR' wherein R and R' are individually selected from the group consisting of hydrocarbyl containing from 1 to 20 carbon atoms.

21. A polymer composition according to claim 12 wherein said oxidized polymer is an oxidized polyethylene.

22. A polymer composition according to claim 12 wherein said composition contains an alkaline earth metal carbonate in an amount of from 2 to 80%, based on the weight of said polymer composition.

* * * * *

REEXAMINATION CERTIFICATE (2278th)
United States Patent [19]
Stoloff et al.

[11] B1 4,203,880

[45] Certificate Issued Apr. 26, 1994

[54] LUBRICANT COMPOSITION FOR HALOGEN-CONTAINING POLYMERS

[75] Inventors: Alfred Stoloff, Livingston; Anthony L. Williams, Summit, both of N.J.

[73] Assignee: M&T Chemicals Inc., Stamford, Conn.

Reexamination Request:
No. 90/002,956, Feb. 11, 1993

Reexamination Certificate for:
Patent No.: 4,203,880
Issued: May 20, 1980
Appl. No.: 959,707
Filed: Nov. 13, 1978

[51] Int. Cl.$^5$ .......................... C08K 5/57; C08K 5/59; C08K 3/26; C08L 91/06
[52] U.S. Cl. .................................. 524/182; 524/400; 524/425; 525/214; 525/240; 264/300
[58] Field of Search ............... 524/178, 182, 275, 425, 524/487, 489

[56] References Cited
U.S. PATENT DOCUMENTS

| | | | |
|---|---|---|---|
| 3,756,999 | 9/1973 | Stetter et al. | 260/88.2 |
| 3,817,915 | 6/1974 | Kauder et al. | 524/182 |
| 3,862,066 | 1/1975 | Reiter et al. | 260/23 |
| 4,118,371 | 10/1978 | Kugele | 524/182 |

OTHER PUBLICATIONS

Society of Plastics Engineers; The use of Molecular Weight Polyethylene in Rigid PVC Lubrication; David Hurwitz; Annual Technical Conference, vol. 19 (1973) pp. 349-354.

Technical Papers; Low Molecular Weight Polyethylene Waxes as External Lubricants for Rigid PVC Pipe Formulations; C. D. Holt; Regional Technical Conference, Part 1 (1977) pp. 61-74.

*Primary Examiner*—Paul R. Michl

[57] ABSTRACT

The processability and melt strength of halogen-containing polymers derived at least in part from vinyl chloride or vinylidene chloride are significantly improved using a conventional external lubricant in combination with an oxidized ethylene polymer exhibiting a melt viscosity of from 1,000 to about 60,000 centipoises at 140° C. and an acid number of at least 5.

REEXAMINATION CERTIFICATE ISSUED UNDER 35 U.S.C. 307

NO AMENDMENTS HAVE BEEN MADE TO THE PATENT

AS A RESULT OF REEXAMINATION, IT HAS BEEN DETERMINED THAT:

The patentability of claims 1-22 is confirmed.

* * * * *